United States Patent [19]

Teramachi

[11] Patent Number: 4,693,131

[45] Date of Patent: Sep. 15, 1987

[54] FEEDING APPARATUS EMPLOYING BALL SCREW

[76] Inventor: Hiroshi Teramachi, 2-34-8, Higashi-Tamagawa, Setagaya-Ku, Tokyo, Japan

[21] Appl. No.: 743,698

[22] Filed: Jun. 11, 1985

[30] Foreign Application Priority Data

Jun. 13, 1984 [JP] Japan ................. 59-119786

[51] Int. Cl.⁴ ........................................... F16H 25/22
[52] U.S. Cl. ................. 74/424.8 B; 74/441; 74/459
[58] Field of Search ............ 74/424.8 B, 424.8 R, 74/424.8 NA, 441, 459

[56] References Cited

U.S. PATENT DOCUMENTS

| | | | |
|---|---|---|---|
| 2,630,022 | 3/1953 | Terdina | 74/424.8 B |
| 2,860,226 | 11/1958 | Schrader | 74/424.8 B |
| 2,936,645 | 5/1960 | Morris et al. | 74/424.7 |
| 3,240,856 | 3/1966 | Wynne | 74/424.8 B |
| 3,407,680 | 10/1968 | Westmoreland | 74/424.8 B |
| 3,803,926 | 4/1974 | Winter | 74/424.8 B |
| 3,803,927 | 4/1974 | Lawler | 74/424.8 B |
| 4,438,986 | 3/1984 | Teramachi | 74/424.8 B |
| 4,530,251 | 7/1985 | Heale | 74/424.8 B |
| 4,542,661 | 9/1985 | Teramachi | 74/424.8 R |
| 4,557,156 | 12/1985 | Teramachi | 74/441 |
| 4,614,128 | 9/1986 | Fickler | 74/424.8 B |

FOREIGN PATENT DOCUMENTS

83/02141 6/1986 PCT Int'l Appl. .
2094930 9/1982 United Kingdom ......... 74/424.8 B

*Primary Examiner*—Allan D. Herrmann
*Attorney, Agent, or Firm*—Kenyon & Kenyon

[57] ABSTRACT

A feeding apparatus which employs a ball screw includes a movable table movably supported on a fixed bed. A ball screw shaft is supported at one of its ends by the fixed bed in such a manner that the ball screw shaft is movable in the direction of rotation thereof and immovable in the axial direction thereof. A ball nut is fitted on the ball screw shaft through steel balls and is supported by the movable table in such a manner that the ball nut is movable in the direction of rotation thereof and immovable in the axial direction thereof. A first drive source is mounted on the fixed bed to rotate the ball screw shaft, and a second drive source is mounted on the movable table and operatively connected to the ball nut through a hollow transmission shaft. The ball screw shaft has the other end thereof concentrically received in the hollow inside of the transmission shaft in such a manner that the ball screw shaft is rotatable and movable relative to the transmission shaft in the axial direction thereof.

1 Claim, 6 Drawing Figures

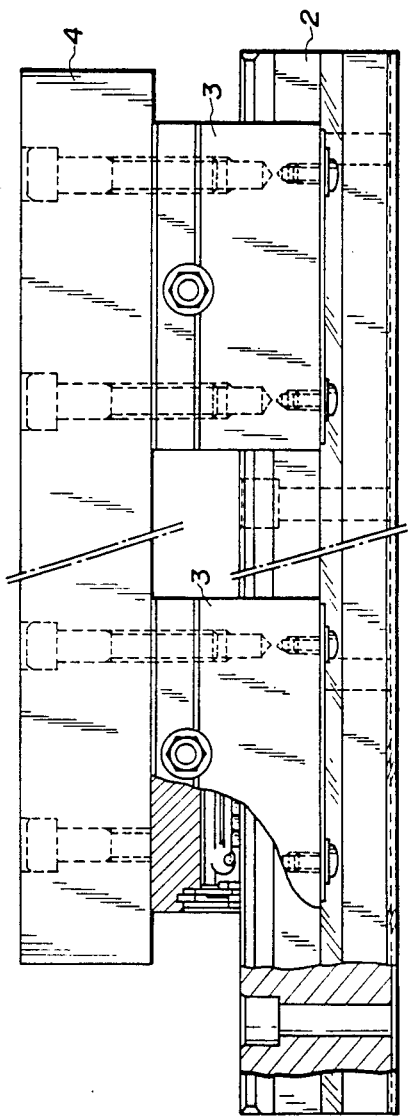
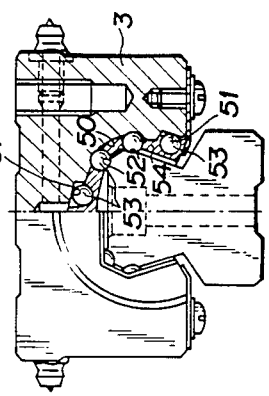
FIG. 5
FIG. 6

FEEDING APPARATUS EMPLOYING BALL SCREW

BACKGROUND OF THE INVENTION

1. Field of the Invention:

The present invention relates to a feeding apparatus employing a ball screw in which a ball nut is fitted on a ball screw shaft through steel balls, and the ball nut and the ball screw shaft are rotated or axially moved relative to each other, whereby a movable table, such as a work table, which is connected to the ball nut is selectively moved in either a fine feed or quick traverse mode.

2. Description of the Prior Art:

A known feeding apparatus has heretofore been arranged as follows. A ball screw shaft is supported on a fixed bed in such a manner as to be movable in the direction of rotation thereof and immovable in the axial direction thereof. A stepping motor is connected to the ball screw shaft, and a ball nut is fitted on the ball screw shaft through steel balls. Further, a movable table is connected to the ball nut. With this arrangement, the ball screw shaft is rotated by the drive of the stepping motor such as to move the ball nut in the axial direction of the ball screw shaft, whereby the movable table connected to the ball nut is moved relative to the fixed bed.

Such a conventional feeding apparatus, however, suffers the following disadvantages.

As the ball screw shaft is rotated a predetermined angle as the result of the rotation of the stepping motor by one step (e.g., a rotational angle of 360/800=0.45° in the case of a stepping motor with 800 steps), the ball nut is moved relative to the ball screw shaft in the axial direction thereof by a predetermined distance in correspondence to the lead of the threads which are respectively formed on the ball screw shaft and the ball nut. In this case, it may be possible to change over the feed mode of the movable table between a fine feed mode and a quick traverse mode by varying the lead angle of the threads, or by interposing a speed change gear between the stepping motor and the ball screw shaft and varying the amount of axial movement of the ball nut corresponding to a predetermined rotational angle of the motor by means of the speed change gear. However, if the lead of the threads is decreased for the purpose of obtaining a fine feed operation, then it becomes impossible to effect a quick traverse operation and it is also difficult to carry out a precise thread cutting operation; if the lead of the threads is increased, it becomes difficult to effect a fine feed operation. On the other hand, when a speed change gear is employed, the size of the apparatus as a whole becomes unfavorably large. In addition, it is extremely difficult to effect an accurate fine feed operation owing to unavoidable errors in production of the speed change gear itself. Further, when a stepping motor with a relatively large number of steps (i.e., a relatively small angle of rotation per step) is used to obtain a fine feed operation, the production cost of the apparatus as a whole is increased by a large margin since such a stepping motor with a large number of steps is extremely costly.

Furthermore, since the ball screw shaft and the motor are connected through a gear with a pair of gear wheels which are meshed with each other, any backlash between these gear wheels may make it difficult to accurately transmit the rotational driving force derived from the motor to the ball screw shaft. In addition, since the ball screw shaft per se has relatively large inertia, it is not possible to accurately position the movable table connected to the ball nut which is fitted on the ball screw shaft. Moreover, the above-described facts disadvantageously involve inferior responsiveness, that is, it is not possible for the ball screw shaft to quickly respond to a change in the rotational direction of the motor. Moreover, in the case where the ball screw shaft is rotated at high speed for the purpose of increasing the feed rate of the movable table, when the rotational speed of the ball screw shaft being thus increased exceeds a predetermined value (what is called critical speed), the ball screw shaft undesirably vibrates sympathetically. It is therefore necessary for the ball screw shaft to be rotated below an allowable rotational speed which is determined by the critical speed, which fact disadvantageously limits the range of quick traverse of the movable table.

SUMMARY OF THE INVENTION

In view of the above, it is a primary object of the present invention to provide a low-cost feeding apparatus employing a ball screw which requires no speed change gear and in which two drive sources are employed, one of the drive sources being used to rotate a ball screw shaft, while the other being used to actuate a ball nut fitted on the ball screw shaft such as to rotate relative to the shaft, whereby the movements of the ball nut as the result of the respective operations of the two drive source are added, or the difference therebetween is obtained, so as to move the ball nut relative to the ball screw shaft in a fine feed mode or a quick traverse mode with extremely high accuracy, thereby allowing a highly accurate positioning operation, and in which the rotational driving force derived from the other drive source is accurately transmitted to the ball nut so that it is possible to greatly increase the degree of accuracy in positioning a movable table which is connected to the ball nut and to improve the responsiveness of the ball nut and hence of the movable table at the time of a change in rotational direction of the drive sources.

It is another object of the present invention to provide a feeding apparatus employing a ball screw which allows the feed rate of the movable table to be increased as desired without any restriction.

To these ends, according to the invention, a first drive source is operatively connected to a ball screw shaft, and a second drive source which is mounted on a movable table is operatively connected through a hollow transmission shaft to a ball nut which is connected to the movable table and fitted on the ball screw shaft.

The above and other objects, features and advantages of the present invention will become clear from the following description of the preferred embodiment thereof, taken in conjunction with the accompanying drawings.

BRIEF DESCRIPTION OF THE DRAWINGS

The accompanying drawings in combination show one embodiment of the feeding apparatus according to the present invention, in which:

FIG. 5 is a fragmentary side elevational view of a movable table employed in the embodiment; and FIG. 6 is a front elevational view of a bearing unit employed in the embodiment, a half of it being shown in section.

DESCRIPTION OF THE PREFERRED EMBODIMENT

One embodiment of the feeding apparatus employing a ball screw according to the present invention will be described hereinunder with reference to the accompanying drawings.

Figure 1:
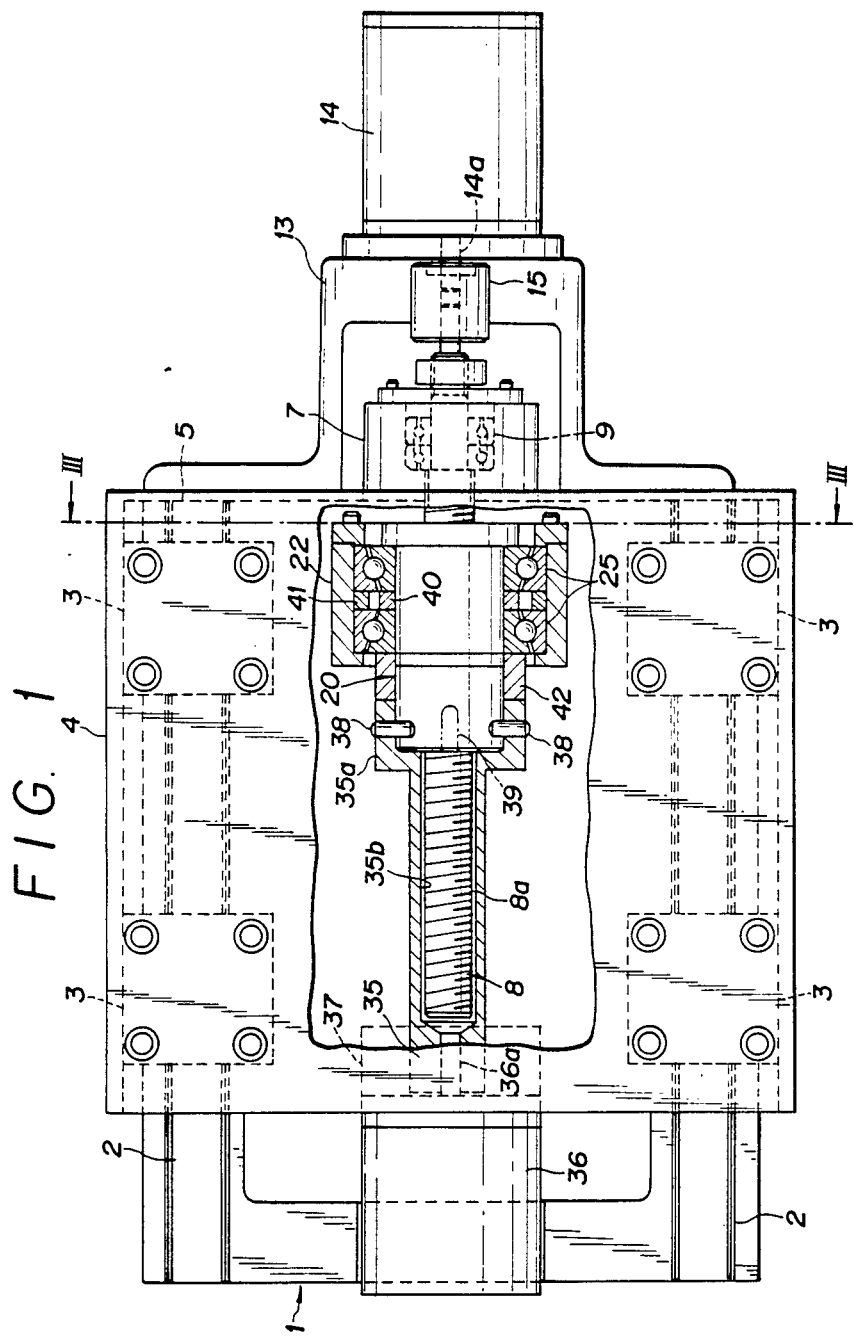
FIG. 1 is a fragmentary plan view of an essential part of the embodiment.
Figure 2:
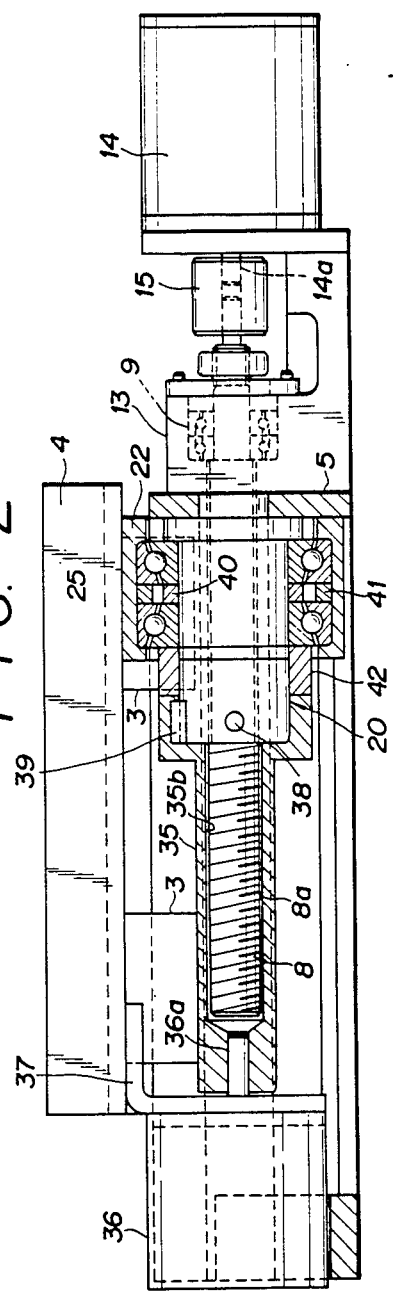
FIG. 2 is a sectional side elevational view of the essential part shown in FIG. 1 taken along the longitudinal axis thereof.
Figure 3:
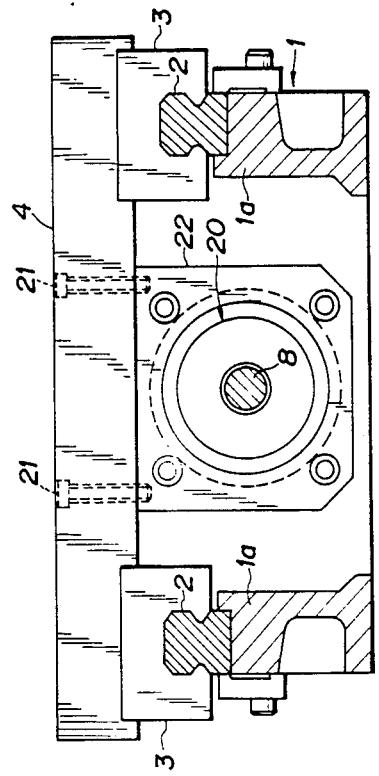
FIG. 3 is a sectional view taken along the line III—III of FIG. 1.

Referring first to FIGS. 1 to 3, a fixed bed 1 has flanges 1a respectively formed on both its sides A pair of parallel track rails 2 are respectively disposed on the upper surfaces of the flanges 1a. A movable table 4 is provided on these track rails 2 through four bearings 3 for linear motion in such a manner that the movable table 4 is slidable on the track rails 2 in the axial direction of the fixed bed 1.

As will be clear from FIGS. 1 and 2, an end plate 5 is secured to one end (the right end as viewed in FIGS. 1 and 2) of the bed 1. The end plate 5 has a bearing case 7 secured thereto. The bearing case 7 rotatably supports one of the ends of a ball screw shaft 8 through a bearing 9 which is constituted by a double row angular contact ball bearing, the ball screw shaft 8 extending parallel to the track rails 2. The end portion of the ball screw shaft 8 projecting from the bearing 9 is connected through a coupling 15 to a rotating shaft 14a of a stepping motor 14 which serves as a first drive source and is mounted on a bracket 13 which is secured to the end plate 5 of the bed 1.

The ball screw shaft 8 is formed on its outer peripheral surface with a spiral thread groove (e.g., a right-hand thread groove) 8a over the substantially entire length of the shaft 8 except for the journal portion at one end thereof. The ball screw shaft 8 further has a ball nut 20, described later, fitted thereon. The ball nut 20 is supported by a housing 22 through a bearing 25 which is constituted by a double row angular contact ball bearing in such a manner that the ball nut 20 is immovable in the axial direction thereof but movable in the direction of rotation thereof, the housing 22 being secured to the underside of the movable table 4 by fastening members 21 such as screws. Accordingly, as the ball screw shaft 8 is rotated, the ball nut 20 moves relative to the ball screw shaft 8 in the axial direction thereof.

Figure 4:
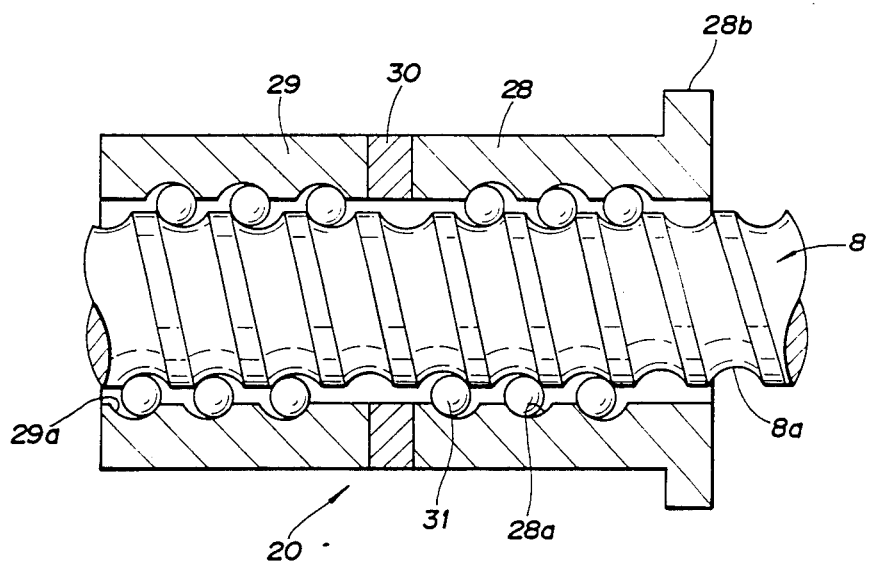
FIG. 4 is an enlarged sectional view of a ball nut employed in the embodiment taken along the longitudinal axis thereof.

The construction of the ball nut 20 will now be explained with reference to FIG. 4.

The cylindrical ball nut 20, which is fitted on the outer periphery of the ball screw shaft 8, is constituted by a first cylindrical nut element 28 which has an annular flange 28b at one of the ends thereof, a second cylindrical nut element 29, and an annular distance piece 30 interposed between the first and second nut elements 28 and 29. The first and second nut elements 28 and 29 are respectively formed on their inner peripheral surfaces with spiral thread grooves 28a and 29a in such a manner that these thread grooves 28a and 29a correspond to the spiral thread groove 8a formed on the outer periphery of the ball screw shaft 8 and have the same lead as that of the latter. A multiplicity of steel balls 31 are disposed between the thread grooves 28, 29a and the thread groove 8a. Thus, as the ball screw shaft 8 is rotated, the steel balls 31 roll within the space between the thread groove 8a of the ball screw shaft 8 and the respective thread grooves 28a, 29a of the first and second nut elements 28, 29, thus causing the ball nut 20 constituted by the first and second nut elements 28, 29 to move relative to the ball screw shaft 8 in the axial direction thereof. In this case, the first and second nut elements 28 and 29 are biased by the distance piece 30 interposed therebetween in the direction in which they are separated from each other. There is therefore no backlash (axial gap) between the steel balls 31 and the thread grooves 8a, 28a and 29a, which fact provides excellent responsiveness, that is, it is possible for the ball nut 20 to start to move in the axial direction of the ball screw shaft 8 in response to the rotation of the shaft 8 without any delay.

Further, the ball nut 20 is connected to a stepping motor 36, serving as a second drive source, through a hollow transmission shaft 35. More specifically, the stepping motor 36 is mounted on the movable table 4 through a bracket 37. The rotating shaft 36a of the stepping motor 36 is secured to one of the ends of the hollow transmission shaft 35. One end of the ball nut 20 is fitted into an annular socket 35a which is integrally formed at the other end of the transmission shaft 35. The socket 35a and the ball nut 20 are connected together by means of knock pins 38 and a key 39 so that they rotate together in one unit. The transmission shaft 35 is disposed concentrically with the ball screw shaft 8, and one end of the ball screw shaft 8 is fitted in the hollow inside 35b of the transmission shaft 35 in such a manner that the shaft 8 is rotatable and axially slidable.

It is to be noted that the reference numerals 40 and 41 in the drawings denote distance pieces which are interposed between a pair of angular contact ball bearings 9, while the numeral 42 represents a spacer which is interposed between one of the angular contact ball bearings 9 and the socket 35a of the transmission shaft 35.

Referring next to FIGS. 5 and 6, the movable table 4 is slidably supported on the track rails 2 through the four bearings 3 for linear motion. More specifically, each of the bearings 3 is formed on its inner surface with loaded ball grooves 50 and non-loaded ball grooves 51, which extend axially of the bearing 3 and are alternately interposed in the circumferential direction thereof. Each of the loaded ball groove 50 and the non-loaded ball groove 51 which is adjacent to that loaded ball groove 50 are continuously connected at each of their ends such as to form an endless loop. Each of the track rails 2 is also formed with ball rolling surfaces 52 in such a manner that they respectively correspond to the loaded ball grooves 50 on each of the associated bearings 3. A multiplicity of balls 53 are disposed between the loaded ball grooves 50 and the ball rolling surfaces 52 and within the non-loaded ball grooves 51. The balls 53 are retained by a retainer 54 which is disposed between each bearing 3 and the corresponding track rail 2. Accordingly, as the bearings 3 move on the track rails 2 in the axial direction thereof, the balls 53 roll through the space between the loaded ball grooves 50 and the ball rolling surfaces 52 and enter the non-loaded ball grooves 51 where the balls 53 move axially of the bearings 3 and then return to the space between the loaded ball grooves 50 and the ball rolling surfaces 52. Thus, it is possible to ensure smooth movement of the movable table 4 on the track rails 2.

The following is a description of the operation of the above-described embodiment.

It is assumed that, as the stepping motor 14 which is connected to the ball screw shaft 8, a stepping motor is employed which has 800 steps, that is, the rotational angle per step is 360/800=0.45°, and as the stepping motor 36 which is connected to the ball nut 20, a stepping motor with 1,000 steps is employed, and further, the thread groove 8a formed on the ball screw shaft 8 is right-handed and has a lead of 4 mm.

If the stepping motor 36 is rotated one step clockwise in the state wherein the stepping motor 14 is at rest, the ball nut 20 is rotated 360/1,000=0.36° in the same direction through the transmission shaft 35, whereby the ball nut 20 is axially moved 4×(0.36/360)=0.004 mm relative to the ball screw shaft 8 in the leftward direction (as viewed in FIGS. 1 and 2). Consequently, the movable table 4 is moved the same distance in the same direction (leftward) on the track rails 2 through the housing 22. When the stepping motor 36 is rotated one step counterclockwise, the ball nut 20 is axially moved 0.004 mm relative to the ball screw shaft 8 in the rightward direction, whereby the movable table 4 is also moved the same distance on the track rails 2 in the same direction (rightward).

On the other hand, while the stepping motor 36 is being rotated clockwise, if the stepping motor 14 is rotated in the opposite direction (counterclockwise) relative to the rotational direction of the stepping motor 36, the ball screw shaft 8 is rotated 360/800=0.45° counterclockwise by the stepping motor 14 through the coupling 15, thus causing the ball nut 20 fitted on the ball screw shaft 8 to be axially moved 4×(0.45/360)=0.005 mm relative to the shaft 8 in the leftward direction. In consequence, the ball nut 20 is moved leftwardly in the axial direction of the ball screw shaft 8 by 0.009 mm, which is the sum of its movement as the result of the rotation of the stepping motor 14, that is, 0.005 mm, and its movement as the result of the rotation of the stepping motor 36, that is, 0.004 mm. In other words, the ball nut 20 is rapidly fed or moved in a quick traverse mode.

Further, while the stepping motor 35 is being rotated clockwise, if the stepping motor 14 is rotated one stpe in the same direction (clockwise) as the rotational direction of the motor 36, the ball nut 20 is then axially moved 0.005 mm relative to the ball screw shaft 8 in the rightward direction by the clockwise rotation of the shaft 8. Consequently, the ball nut 20 is moved rightwardly in the axial direction of the ball screw shaft 8 by 0.001 mm, which is the difference between its movement as the result of the rotation of the stepping motor 14, that is, 0.005 mm, and its movement as the result of the rotation of the stepping motor 36, that is, 0.004 mm. In other words, the ball nut 20 is sensitively fed or moved in a fine feed mode.

It is to be noted that, although in the above-described embodiment stepping motors are employed as the drive sources 14 and 36, other types of drive source, such as servo motors, may be employed.

The present invention which has the above-described arrangement and operation offers the following advantageous effects.

By properly controlling two drive sources, the ball screw shaft is rotated a minute angle in a stepwise manner, and the movements of the ball nut as the result of the respective operations of the two drive sources are added, or the difference between those movements is obtained, so as to cause the ball nut to be finely or rapidly fed relative to the ball screw shaft with extremely high accuracy, thereby allowing highly accurate positioning.

Further, it is not necessary for any speed change gear to be interposed between the ball screw shaft and the associated drive source, so that there is no delay in operation which would be caused by a possible play in a speed change gear or clutch, or a possible error in production thereof when a speed change gear is employed. Accordingly, excellent responsiveness is provided, and it is possible for the apparatus as a whole to be arranged into a compact structure. In addition, it is not necessary to decrease the lead of the respective thread grooves on the ball nut and the ball screw shaft or employ a stepping motor which has a small angle of rotation per step and therefore is costly for the purpose of providing a fine feed to the ball nut. It is therefore possible to reduce the production cost of the apparatus as a whole.

Furthermore, since the ball nut fitted on the ball screw shaft and the second drive source are connected through the hollow transmission shaft, it is possible for the rotational driving force derived from the second drive source to be accurately transmitted to the ball nut. Moreover, as compared with the conventional arrangement in which only the ball screw shaft is rotated, it is possible to greatly increase the degree of accuracy in positioning the movable table which is connected to the ball nut by rotating the ball screw shaft at relatively low speed and rotating the ball nut at relatively high speed, the ball nut being much smaller than the ball screw shaft in terms of the size, weight and inertia. By so doing, it is also possible to improve the responsiveness of the ball nut and hence of the movable table at the time when the rotational direction of the second drive source is changed. Additionaly, by rotating the ball nut at high speed while rotating the ball screw shaft at relatively low speed, it is possible for the feed rate of the movable table to be increased as desired without any restriction. Moreover, since there is no transmission gear or similar means interposed between the second drive source and the ball nut, it is advantageously possible to reduce the size and weight of the apparatus as a whole.

Although the invention has been described through specific terms, it is to be noted here that the described embodiment is not exclusive and various changes and modifications may be imparted thereto without departing from the scope of the invention which is limited solely by the appended claims.

What is claimed is:

1. In a feeding apparatus employing a ball screw and ball nut assembly for moving a table axially movably supported on a fixed bed, said apparatus comprising a ball screw supported at one end thereof by the fixed bed in a rotatable and axially immovable manner, a ball nut mounted on said ball screw through balls and supported by said table in an axially immovable manner, and a first drive source mounted on the bed to rotate the ball screw, the improvement in which said ball nut is rotatably supported by said table and a second drive source means mounted on said table for directly rotating said ball nut through a hollow shaft directly receiving the other end of said ball screw so that a fine feed and coarse feed of said table is provided solely by the separate drive of said ball screw and said ball nut.

* * * * *